United States Patent Office 2,853,259
Patented Sept. 23, 1958

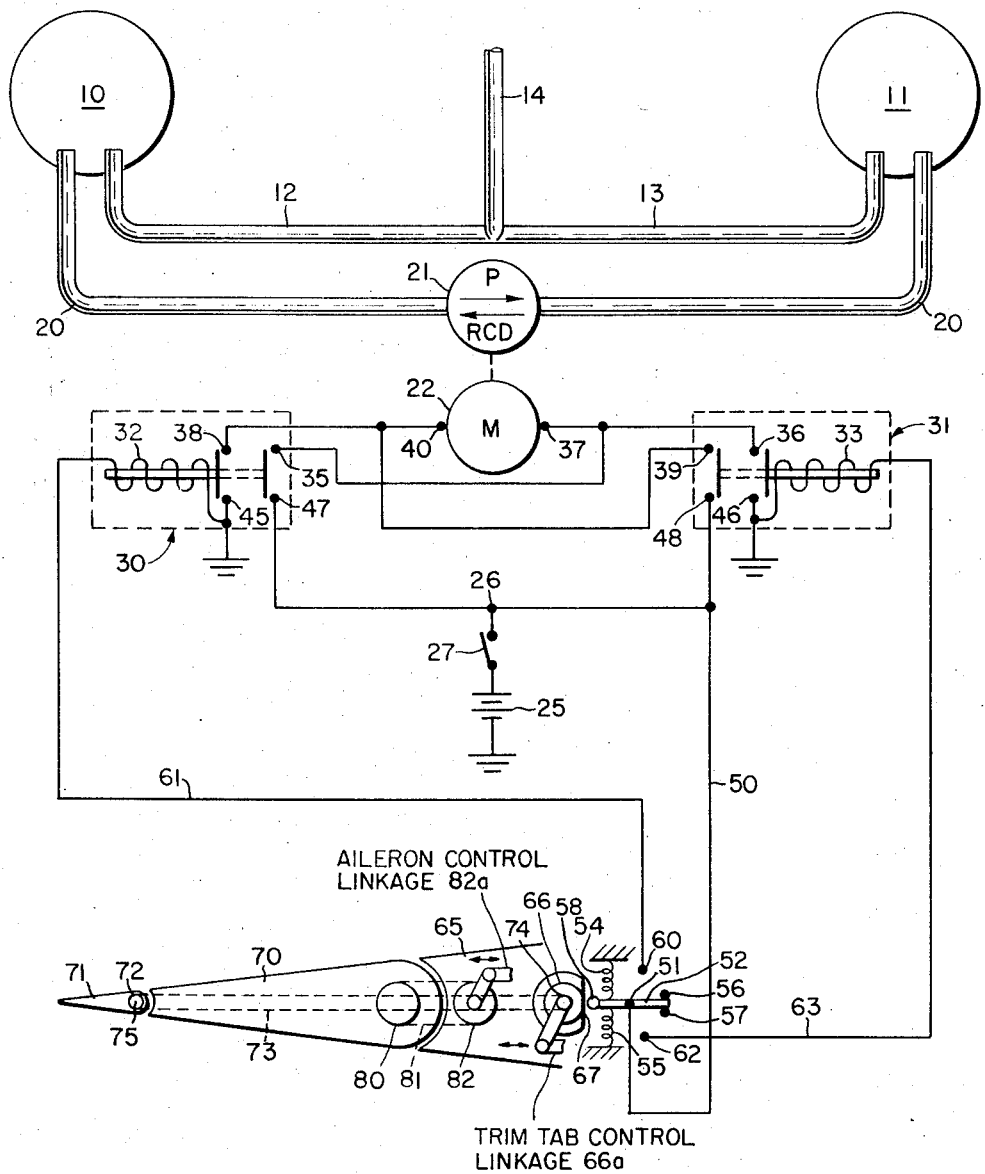

2,853,259

AIRCRAFT FUEL LOAD EQUALIZING SYSTEM

John L. Underwood, Jr., Corpus Christi, Tex.

Application March 28, 1956, Serial No. 574,572

3 Claims. (Cl. 244—135)

(Granted under Title 35, U. S. Code (1952), sec. 266)

The invention described herein may be manufactured and used by or for the Government of the United States of America for governmental purposes without the payment of any royalties thereon or therefor.

The present invention relates to an aircraft fuel load equalizing system and more particularly to such a system employing an interconnection between the trim tab members of an aircraft and pump means which controls the flow of fuel between the fuel tanks of the aircraft. The present application is a continuation-in-part of application Serial No. 464,660, filed October 25, 1954, now Patent No. 2,755,046, issued July 17, 1956.

The invention system is particularly adapted for use in aircraft utilizing auxiliary wing tip fuel tanks or fuel tanks disposed within the wing adjacent the wing tip. In such aircraft, malfunctions frequently occur in the fuel feed system causing a tank on one side of the longitudinal axis of the aircraft to empty faster than a tank on the other side thereof. The resulting difference in weight of the fuel tanks causes the aircraft to become unbalanced about the longitudinal axis thereof, creating a hazardous condition which is particularly dangerous at slow speeds as for instance when landing the aircraft.

As a fuel load unbalance occurs during flight, the pilot of the aircraft subconsciously adjusts the aileron trim tabs to relieve stick pressure resulting from the unequal loading. The apparent wing heaviness is not noticeable to the pilot until the trim tabs are at the limit of their movement at which time a dangerous unbalance already exists. In order to safely land the aircraft or even approach landing speeds when one wing tip tank is substantially heavier than the other, the pilot must either jettison one or both tanks, or jettison the fuel from the tanks. Either of these alternatives is expensive and undesirable.

Since the aileron trim tabs are adjusted to compensate for wing heaviness, the deflection of the aileron trim tabs is a measure of the wing heaviness as caused by an unequal fuel distribution. As disclosed in the parent application an interconnection is provided between the aileron trim tabs and a means which controls the flow of fuel from the fuel tanks whereby predetermined movement of the trim tabs automatically compensates for unequal flow of fuel from the tanks. In the parent application, a fuel control means such as a valve is provided in the conduits connecting the fuel tanks to the main fuel tank of the aircraft, a separate fuel control means being provided for each of the fuel tanks.

The structure as disclosed in the parent application has certain inherent limitations since the balancing action is dependent upon the flow of fuel from only one of the fuel tanks due to the fact that when the system is in the process of balancing the aircraft, one fuel tank is emptying while the other one is not emptying. In addition, if the means for transferring fuel from either of the fuel tanks of the system as shown in the parent application should become inoperative, the fuel in such tank may not be transferred to the engines of the aircraft.

The improved system as disclosed in the present application provides an arrangement wherein an auxiliary conduit provides communication between the oppositely disposed tanks of the aircraft and a reversible pump is connected in the auxiliary conduit whereby fuel may be transferred between the oppositely disposed tanks. In such an arrangement, a faster balancing action may be obtained due to the fact that while the heavier tank is emptying the lighter tank is being filled thereby providing a differential action which serves to balance the aircraft approximately twice as fast as is possible with the structure disclosed in the parent application. Furthermore, all the fuel carried in each of the fuel tanks may be transferred to the main fuel tank or the engines of the aircraft even though the means for transferring fuel from one of the tanks should become inoperative.

An object of the present invention is the provision of a new and novel aircraft fuel load equalizing system which senses unequal fuel loads in wing tip or outer wing fuel tanks.

Yet another object is the provision of a fuel load equalizing system which provides the optimum balancing speed and wherein all the fuel contained in the opposite fuel tanks thereof may be successfully transferred to the engines of the aircraft even though the conventional transferring means for either of the tanks should become inoperative.

A further object of the invention is the provision of a fuel load equalizing system which is simple and inexpensive in construction, yet sensitive and reliable in operation.

Other objects and many of the attendant advantages of this invention will be readily appreciated as the same becomes better understood by reference to the following detailed description when considered in connection with the accompanying drawing which shows a diagrammatic view of a preferred embodiment of the invention.

Referring now to the drawing, oppositely disposed fuel tanks 10 and 11 which are disposed either within the wings of the aircraft or at the wing tips thereof are respectively connected by means of conduits 12 and 13 to a common conduit 14 which may be connected either to the main fuel tank or the engines of the aircraft. Suitable conventional means (not shown) such as air pressure is connected to each of fuel tanks 10 and 11 for forcing the fuel from the fuel tanks into conduits 12 and 13.

An auxiliary conduit 20 is connected to each of fuel tanks 10 and 11 and provides communication therebetween. A fuel pump 21 is connected in conduit 20 and is adapted to be driven in opposite directions by a reversible electric motor 22 which is driven in opposite directions dependent on the directions of electric current flow therethrough. The capacity of pump 21 and the operational characteristics of motor 22 may be selected to provide optimum balancing speed to the system in accordance with well-known design criteria.

A suitable source of electrical energy such as a battery 25 has the negative pole thereof connected to ground and the positive pole thereof connected to a terminal 26 through a switch 27. Switch 27 is located in the cockpit of the aircraft such that the pilot may selectively deactivate the circuit when he desires. Two similar double pole, solenoid operated switches indicated generally by reference numerals 30 and 31 are normally biased to open position and are provided with coils 32 and 33 respectively. Terminals 35 and 36 of switches 30 and 31 respectively are connected to one terminal 37 of electric motor 22, and terminals 38 and 39 of the two switches are connected to the opposite terminal 40 of the electric motor. The terminals 45 and 46 of switches 30 and 31 respectively are connected to ground and it should be noted that the coils of each of the switches are also connected to ground in a similar manner. The terminals 47 and 48 of switches 30 and 31 respectively are connected to the positive pole of the battery 25; and the positive pole of the battery is also connected by means of lead 50 to the pivotal axis 51 of a switch arm 52 thereby providing electrical energy to the switch arm at all times.

Switch arm 52 is normally biased into neutral position as shown in the drawings by means of oppositely disposed springs 54 and 55 and is provided with a plurality of oppositely disposed contacts 56 and 57 at one end thereof. The opposite end of switch arm 52 is provided with a cam member 58 which is adapted to engage a cooperating cam member and thereby actuate the switch arm in opposite directions as more fully hereinafter described.

Contact 56 is adapted to engage a contact 60 which is connected by means of lead 61 to coil 32 of switch 30; and contact 57 is adapted to engage a contact 62 which is connected by means of lead 63 to coil 33 of switch 31.

Reference character 65 indicates a portion of the left wing of the aircraft which rotatably journals a cam member 66 suitably connected to the control linkage 66a extending to the cockpit of the aircraft for operating the aileron trim tabs thereof. Cam member 66 is provided with a cam surface 67 adapted to engage cam member 58 of switch arm 52 for pivoting the switch arm in opposite directions. An aileron 70 is pivotally supported adjacent the trailing edge of wing 65 and a trim tab 71 is pivotally supported adjacent the trailing edge of aileron 70. Trim tab 71 is provided with a suitable quadrant 72 which is connected by conventional means such as a cable or the like indicated by dotted lines 73 to a similar quadrant 74 connected to cam member 66 and the associated trim tab control linkage. It is accordingly apparent that by operation of the trim tab control linkage, cam member 66 is rotated thereby pivoting trim tab 71 about its pivotal axis 75, and the cam surface 67 of cam member 66 will engage cam member 58 of switch arm 52 to suitably energize the above described electrical control circuit. Aileron 70 is provided with a suitable quadrant 80 which is connected by conventional means such as a cable or the like indicated by dotted lines 81 to a similar quadrant 82 suitably journaled in wing 65, quadrant 82 being connected to the conventional control linkage 82a extending to the cockpit of the aircraft whereby the pilot can selectively actuate aileron 70 independently of trim tab 71.

Operation of the invention system is as follows:

Assuming that trim tab 71 is mounted upon the aileron 70 of the left wing 65 of the aircraft and that the left wing tank 10 is heavier than the right wing tank 11, the pilot will subconsciously actuate the control linkage 66a such that cam member 66 is rotated in a clockwise direction as seen in the drawing causing trim tab 71 to pivot in an upward direction. Such deflection of the trim tab will cause aileron 70 to be lowered thereby increasing the lift on wing 65 and tending to raise the left wing and compensate for the left wing heaviness.

As cam member 66 rotates clockwise, it engages cam member 58 which pivots the opposite portion of switch arm 52 in an upward direction such that contact 56 engages contact 60. The positive pole of the battery is then connected through lead 50, switch arm 52, and lead 61 to the coil 32 of switch 30 and subsequently to ground whereby coil 32 is energized closing switch 30, connecting contacts 35 and 47 and contacts 38 and 45 to one another. A circuit is thereby closed through electric motor 22, and the current flow therethrough is such that the pump rotates in the direction to pump fuel from tank 10 into tank 11. It is evident that as the fuel flows from the heavier left tank 10 into the lighter right tank 11, the weight of tank 10 decreases and the weight of tank 11 increases whereby such differential action rapidly balances the weights of the tanks and relieves the unbalanced condition of the load.

When tank 11 has substantially the same weight as tank 10, the heaviness of the left wing will no longer exist and the pilot will subconsciously readjust trim tab 71 to its original position. Switch arm 52 is then biased to its neutral position by springs 54 and 55, opening the circuit through coil 32 of switch 30 thereby allowing switch 30 to be biased to open position interrupting the current flow through electric motor 22 and stopping the operation of pump 21. Should the right wing tank 11 become heavier than the left wing tank 10, cam member 66 will be rotated in a counterclockwise direction, engaging switch arm 52 in such a manner as to close the circuit through switch 31 thereby closing the switch and energizing electric motor 22 in such a direction that fuel is pumped from tank 11 into tank 10. In this manner, fuel is pumped from the slower feeding tank into the faster feeding tank at all times during operation of the aircraft, maintaining a balanced condition thereof during flight.

It is apparent that any suitable interconnection between the control linkage 66a for the trim tabs and switch arm 52 may be employed, and cam members 66 and 58 are suitably dimensioned such that contacts 56 and 57 engage contacts 60 and 62 respectively upon movement of the trim tab control linkage to compensate for a wing heaviness on the order of 100 pounds.

Cam member 66 is preferably adjustably secured to the trim tab control linkage 66a such that the relative position of cam member 66 and the control linkage may be slidably adjusted. With such an arrangement, it is possible for the pilot to trim the aircraft to compensate for any wing heaviness due to causes other than unbalanced fuel loading. When such an adjustment has been made, cam member 66 may be secured to the control linkage in its neutral position as shown in the drawing whereupon subsequent operation of the trib tab control linkage upon the occurrence of an unbalanced fuel loading will cause switch arm 52 to be rotated into its proper operative position. It should also be noted that should the means for transferring fuel from either of the tanks 10 or 11 become inoperative, the fuel from such tank may be transferred to the opposite tank and subsequently transferred to the engines of the aircraft. In this manner, all the fuel in the fuel tanks may be utilized even though the normal means for transferring the fuel from one of the tanks should become inoperative.

It is apparent from the foregoing that there is provided a new and novel aircraft fuel load equalizing system which senses unequal fuel loads in wing tip or outer wing fuel tanks and wherein the optimum balancing speed may be obtained. All the fuel carried in either of the fuel tanks of the aircraft may be used even though the means for transferring fuel from one of the tanks should become inoperative during operation, and the system is simple and inexpensive in construction.

Obviously many modifications and variations of the present invention are possible in the light of the above teachings. It is therefore to be understood that within the scope of the appended claims the invention may be practiced otherwise than as specifically described.

I claim:

1. In an aircraft having a plurality of fuel tanks disposed on opposite sides of the longitudinal axis thereof, a fuel load equalizing system which comprises fuel feed conduits connected to said tanks, an auxiliary conduit connected to each of said fuel tanks and providing communication therebetween, pump means connected in said auxiliary conduit for controlling the flow of fuel therethrough, aileron members mounted in the wings of said aircraft, trim tab control surfaces pivotally mounted on said aileron members, means forming part of the control linkage of said aircraft and controlled by the pilot thereof for operating said aileron members, means also forming part of the control linkage of said aircraft for operating said trim tab control surfaces independently of said aileron members, and means operative upon a predetermined movement of said trim tab control surfaces for controlling the operation of said pump means.

2. In an aircraft having a plurality of fuel tanks disposed on opposite sides of the longitudinal axis thereof, a fuel load equalizing system which comprises fuel feed conduits connected to said tanks, an auxiliary conduit connected to each of said fuel tanks and providing communication therebetween, reversible pump means connected in said auxiliary conduit for controlling the flow of fuel therethrough, aileron members mounted in the wings of said aircraft, trim tab control surfaces pivotally mounted on said aileron members, means forming part of the control linkage of said aircraft and controlled by the pilot thereof for operating said aileron members, means also forming part of the control linkage of said aircraft for operating said trim tab control surfaces independently of said aileron members, a circuit for energizing said pump means, said circuit including a cam-actuated switch, and a cam connected to said trim tab operating means for actuating said switch to energize said pump means upon a predetermined movement of said trim tab operating means.

3. A system as defined in claim 2 wherein said pump means includes an electric motor connected in said circuit and adapted to be driven in opposite directions dependent on the direction of electric current flow therethrough.

References Cited in the file of this patent

UNITED STATES PATENTS

| | | |
|---|---|---|
| 2,356,786 | Harman et al. | Aug. 29, 1944 |
| 2,672,880 | Hermanson | Mar. 23, 1954 |
| 2,755,046 | Underwood | July 17, 1956 |